(12) United States Patent
Patel et al.

(10) Patent No.: US 7,180,656 B2
(45) Date of Patent: Feb. 20, 2007

(54) COMPACT OPTICAL AMPLIFIER

(75) Inventors: Falgun D. Patel, Pacifica, CA (US); Jeffrey N. Miller, Los Altos Hills, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 181 days.

(21) Appl. No.: 10/819,827

(22) Filed: Apr. 7, 2004

(65) Prior Publication Data

US 2005/0225815 A1 Oct. 13, 2005

(51) Int. Cl.
*H01S 3/00* (2006.01)
*C03B 37/075* (2006.01)

(52) U.S. Cl. .................... 359/341.5; 65/390
(58) Field of Classification Search ............. 359/341.5; 65/390
See application file for complete search history.

(56) References Cited

U.S. PATENT DOCUMENTS

| 5,858,891 | A * | 1/1999 | Auzel et al. ................ 501/3 |
| 6,512,879 | B1 * | 1/2003 | Beguin et al. ............. 385/142 |
| 6,519,975 | B1 * | 2/2003 | Bange et al. ................ 65/384 |
| 6,538,805 | B1 * | 3/2003 | Norwood et al. ........ 359/341.5 |
| 6,611,372 | B1 * | 8/2003 | Peyghambarian et al. ................... 359/341.1 |
| 6,859,606 | B2 * | 2/2005 | Jiang et al. ............... 385/142 |
| 6,970,494 | B1 * | 11/2005 | Bendett et al. ............ 372/102 |
| 2004/0233941 | A1 * | 11/2004 | Fajardo et al. ................ 372/6 |
| 2005/0225842 | A1 * | 10/2005 | Patel et al. ............. 359/337.1 |
| 2005/0226590 | A1 * | 10/2005 | Patel et al. ................ 385/142 |

* cited by examiner

*Primary Examiner*—Deandra M. Hughes

(57) ABSTRACT

The optical amplifier has a waveguide including a core and a cladding. The cladding at least partially surrounds the core and is doped with at least one species of rare earth ion in the range of 5 to 75 wt %. In another embodiment, the core is doped with $Er^{3+}$ in the range of 7 to 9 wt % and with $Yb^{3+}$ in the range of 11 to 13 wt %.

7 Claims, 5 Drawing Sheets

COMPACT OPTICAL AMPLIFIER

FIELD OF THE INVENTION

The technical field of this disclosure is optical amplifiers, particularly compact, rare earth doped optical amplifiers.

BACKGROUND OF THE INVENTION

Optical amplifiers amplify light as it propagates within a waveguide, such as an optical fiber. Optical amplifiers remove the need to convert the optical signal to an electrical signal with a photodetector, amplify the electronic signal, and then use the amplified electronic signal to modulate a laser to provide regeneration of the original optical signal. Optical amplifiers are used as repeaters, optical preamplifiers, and gain blocks within telecommunication systems in which optical fibers form the system backbone. Several types of optical amplifiers have been researched for use in telecommunication systems. Raman amplifiers require large optical pump power. Brilliouin amplifiers are limited to communication systems at bit rates of less than 50 MHz. Semiconductor laser amplifiers have inherently lower signal to noise ratio and are often limited in gain.

Rare earth doped amplifiers are formed in waveguides including optical fibers. When the core of a waveguide is lightly doped (0.01 to 0.3 wt %) with rare earth ions, such as erbium, as is typical, the waveguide is operable to amplify a signal, although the waveguide must be long to provide the desired gain. Erbium doped fiber amplifiers require lengthy fibers wrapped around fiber spools, so they are large devices and unsuitable for integration in compact systems. For long haul telecommunication systems, the long erbium doped fiber lengths and the required banks of large optical pump lasers are acceptable. As the optical systems get closer to the homes and businesses, it is desirable for the amplifiers to be smaller, less expensive and integrated into the system.

The amplification provided by a rare earth doped amplifier increases with the doping level of the rare earth dopant in the waveguide. Silica glasses can absorb a limited concentration (up to about 0.01 wt %) of a rare earth dopant before the dopant precipitates out of the glass. When silica glass boules with high levels of rare earth dopants are drawn into fibers, the resulting fiber is very fragile and breaks more easily than an undoped silica fiber. Thus, the length of silica fibers that can be reliably obtained is limited when the silica is heavily doped with rare earth ions.

Moreover, as the rare earth dopant level increases in silica glass, the rare earth ions form ion clusters. When the rare earth ions are excited by an optical pump, part of the pump energy is exchanged between the ions in the cluster. This energy not used for amplification and the amplification process is quenched when such clusters form in the silica glass. It would be desirable to have a compact optical amplifier that would overcome the above disadvantages.

SUMMARY OF THE INVENTION

Embodiments of the invention provide an optical amplifier composed of an optical waveguide fabricated in a glass capable of being heavily doped with at least one species of rare earth ion. The glass is one in which rare earth ions do not precipitate out at high doping levels. In other embodiments, the glass is doped with at least two species of rare earth ion at least in the waveguide core to prevent the formation of ion clusters, which would otherwise quench the amplification. Using multiple species of rare earth dopants additionally provides a larger absorption cross section for the optical pump. In one embodiment, the amplifier provides 4 dB gain with a waveguide only 3 mm long and a pump power of less than 180 mW. An amplifier of such small size can be used as a component in a telecommunication system integrated with other system components, such as signal and pump sources.

One aspect of the present invention provides a compact optical amplifier. The amplifier has a waveguide including a core and a cladding. The cladding at least partially surrounds the core and the core is doped with at least one species of rare earth ion in the range of 5 to 75 wt %.

A second aspect of the present invention provides a compact optical amplifier. The amplifier has a waveguide including a core and a cladding. The cladding at least partially surrounds the core and the core is doped with $Er^{3+}$ in the range of 7 to 9 wt % and additionally with $Yb^{3+}$ in the range of 11 to 13 wt %.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF PRESENTLY PREFERRED EMBODIMENTS

Embodiments of the invention employ an appropriate choice of glass, heavily doped with at least on rare earth ion, to form the waveguide of a compact optical amplifier. In addition, in accordance with the invention, doping the glass with more than one rare earth ion decreases the probability of ion cluster formation and, hence, allows a higher doping level to be obtained before the onset of ion cluster formation. Doping with more than one rare earth ion also increases the absorption cross-section of the pump power. In this manner, a larger percentage of the rare earth ions in the waveguide are excited by the pump power and can contribute to signal amplification. In accordance with the invention, a useful amplification of an optical signal is obtained in a waveguide only a few millimeters long.

Figure 1:
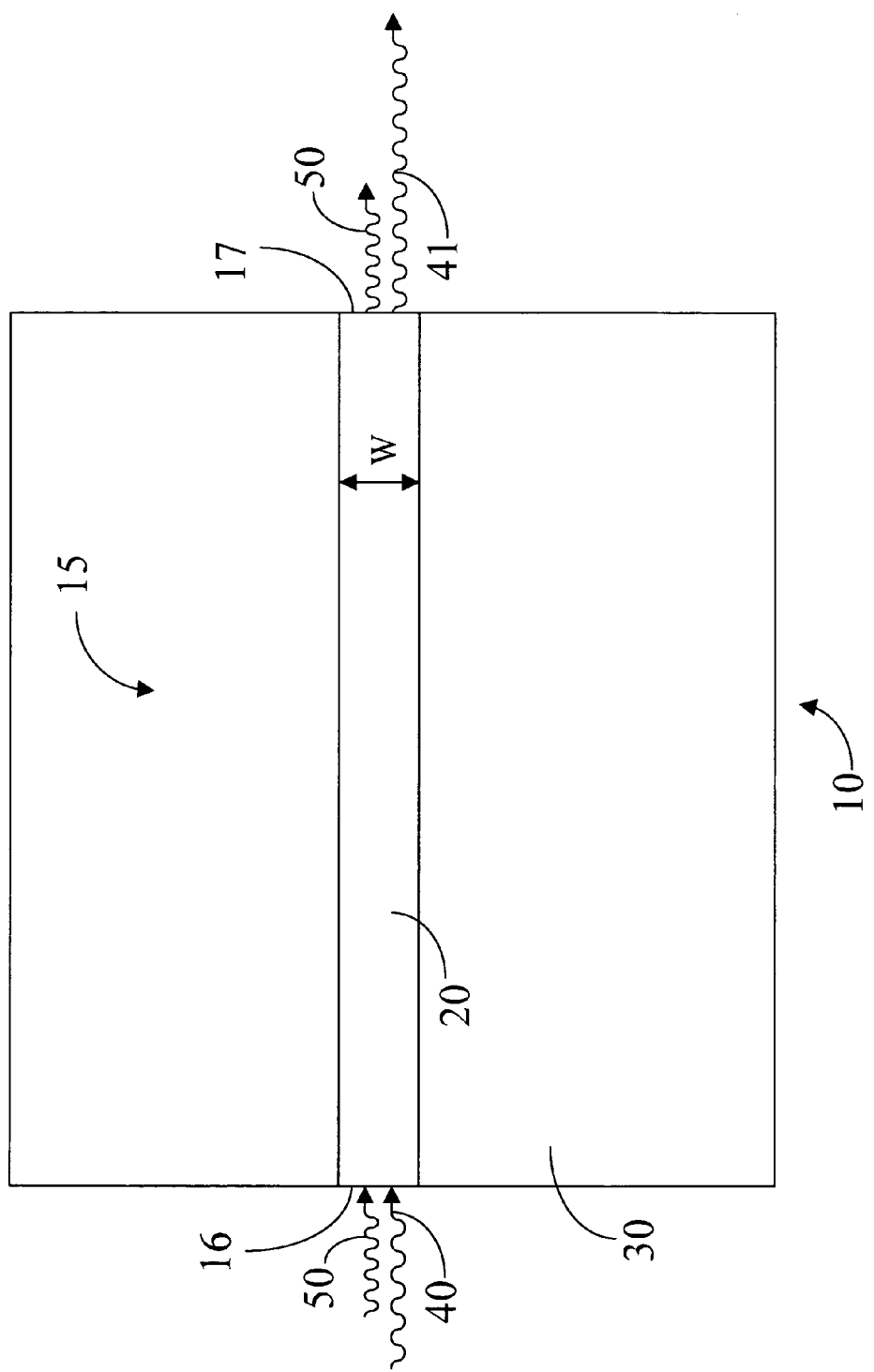
FIG. 1 shows a top view of a schematic of a compact optical amplifier in accordance with the present invention.
Figure 2:
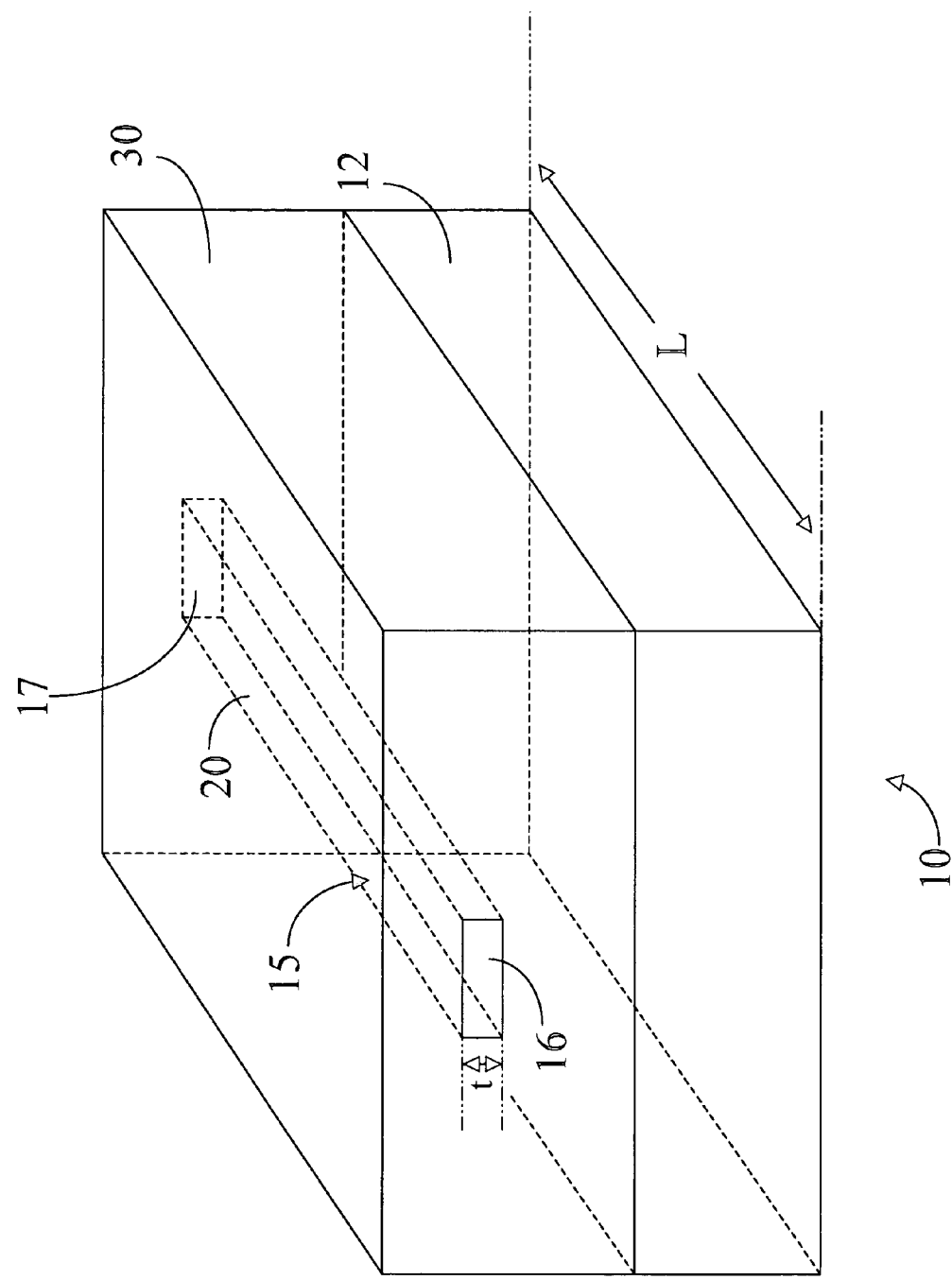
FIG. 2 shows a perspective view of the compact optical amplifier shown in FIG. 1.

FIG. 1 and FIG. 2 show a top view and an isometric view, respectively, of an exemplary embodiment of a compact optical amplifier 10 in accordance with the invention. The compact optical amplifier 10 is composed of a waveguide 15 that has a core 20 heavily doped with at least one species of rare earth ion (not shown). The waveguide 15 additionally has a cladding 30, an input endface 16, and an output endface 17. The core 20 of width W contacts the cladding 30. The cladding 30 has an index of refraction less than that of the core 20. The waveguide 15 is operable to support propagation of one or more optical modes of radiation above a certain wavelength.

An optical signal 40 and optical pump power 50 are coupled into the core 20 at the input endface 16 of the waveguide 15. The optical pump power 50 excites the rare earth doped ions in the core 20. The amplified signal 41 and the optical pump power 50 exit the waveguide 15 at the output endface 17. In one embodiment, the amplifier optical signal to be amplified has a wavelength in the range of 1.5 µm to 1.7 µm.

As shown in FIG. 2, the waveguide 15 is disposed on a substrate 12. The core 20 has a thickness t and is surrounded by the cladding 30 to form the waveguide 15. In an alternative embodiment, the substrate 12 and the cladding 30 are formed from the same material. The waveguide has a length L between the input endface 16 and the output endface 17. A length in a range between about 1 millimeter and 10 millimeters will provide useful optical gain.

The materials of the cladding 30 need not have the same index of refraction on all sides of the core 20. The indices of refraction of the cladding 30 and the core 20 and the geometry of the core 20, i.e., the width W and the thickness t, all affect the modal structure of light at a wavelength $\lambda$ propagating in the waveguide. Telecommunication systems generally use single mode fibers and optical signals 40 in the wavelength region of 1.5 µm, so it is desirable that, in telecommunications applications, the waveguide 15 be single mode at the wavelength of 1.5 µm.

In an alternative embodiment, the waveguide 15 is a ridge-loaded waveguide, formed by disposing a layer of a lower index material having a width W and length L on top of a planar waveguide.

Glasses, which host the rare earth dopants, are covalently bonded molecules in the form of a disordered matrix with a wide range of bond lengths and bond angles. Phosphate glass, tellurite glass, or borate glass can accept a much greater concentration of rare earth ions, including $Er^{3+}$ ions, than silica glass before precipitation or ion cluster formation becomes problematical. This higher ion solubility permits a higher gain per unit length. In the compact optical amplifier 10, the material of the core 20 is a phosphate, tellurite, or borate glass heavily doped with rare earth ions. The material of the cladding 30 is also a phosphate, tellurite, or borate glass optionally doped with rare earth ions. In embodiments in which cladding 30 is not doped with rare earth ions, other dopants are used to establish a refractive index difference between the core and the cladding.

In an alternative embodiment, a phosphate, tellurite, or borate glass is the material of both the core 20 and the cladding 30, and both core and cladding are heavily doped with at least one rare earth ion. In embodiments in which the core 20 and the cladding 30 are identically doped with rare earth ions, an additional dopant is injected or diffused into the core 20 to increase the index of refraction of the region that constitutes the core 20. In one embodiment, a patterned diffusion of silver atoms is used as the additional dopant to define the core 20.

In embodiments in which the core 20 and the cladding 30 are doped with different rare earth ions, the dopants are selected so the core 20 has a higher index of refraction than the cladding 30. In this way, the core 20 can support at least one mode of optical signal 40 and optical pump power 50.

The amplification of an optical signal 40 shown in FIG. 1 at a given wavelength results from the interaction of the optical pump power 50 with the rare earth ions. The rare earths, also known as the lanthanides, range from lanthanum with an atomic number of 57 to lutetium with an atomic number of 71, and are lanthanum, cerium, praseodymium, neodymium, promethium, samarium, europium, gadolinium, terbium, dysprosium, holmium, erbium, thulium, ytterbium, and lutetium. Ionization of the rare earths normally forms a trivalent state. For example, the rare earth ion erbium ($Er^{3+}$) has a three level system with stimulated emission transitions at 0.80 µm, 0.98 µm, and 1.55 µm wavelengths.

Various doping concentrations of rare earth ions in the core 20 produce a compact optical amplifier. In one embodiment, the core 20 of the compact optical amplifier 10 is doped with $Er^{3+}$ in the range of 5 to 75 wt %. In another embodiment, the core 20 of the compact optical amplifier 10 is doped with $Er^{3+}$ in the range of 5 to 30 wt %. Typically, the core 20 of the compact optical amplifier 10 is doped with $Er^{3+}$ in the range of 7 to 9 wt %.

Phosphate, tellurite, or borate glasses can accept 5 to 75 wt % of a single species of rare earth ion without precipitation. To prevent the formation of ion clusters, a second species of rare earth ion can be added as a second dopant to the glass. This is desirable since ion clusters promote ion self-interactions in which the absorbed optical pump power 50 is exchanged between clustered ions and does not contribute to amplification of the optical signal 40. Pump power absorbed to excite ion self-interactions depletes the pump power available for amplification. Amplification is quenched if too many ion clusters form.

If the doping level of the second species of rare earth ion is about equal to that of the first species, the second species will decrease the probability of ion cluster formations of either species. A rare earth ion of either species is half as likely to be positioned next to a rare earth ion of the same species. The probability of large ion clusters forming is reduced even more. Thus, mixing different species of rare earth ions reduces ion cluster formations of either species.

In addition, the absorption cross section of the optical pump power 50 in glass doped with more than one species of rare earth ion is larger than the absorption cross section of the optical pump power 50 of the species alone. By doping a phosphate, tellurite or borate glass with two or more species of rare earth ion, more optical pump power 50 is absorbed to provide amplification for optical signal 40.

In one embodiment in which the core 20 is doped with more than one species of rare earth ion, the core 20 of the compact optical amplifier 10 is doped with $Er^{3+}$ in the range of 5 to 75 wt % and $Yb^{3+}$ in the range of 7 wt % to 35 wt %. In another such embodiment, the core 20 of the compact optical amplifier 10 is doped with $Er^{3+}$ in the range of 5 to 30 wt % and $Yb^{3+}$ in the range of 7 wt % to 35 wt %. Typically, the core 20 of the compact optical amplifier 10 is doped with $Er^{3+}$ in the range of 7 to 9 wt % and with $Yb^{3+}$ in the range of 11 to 13 wt %.

Figure 3:
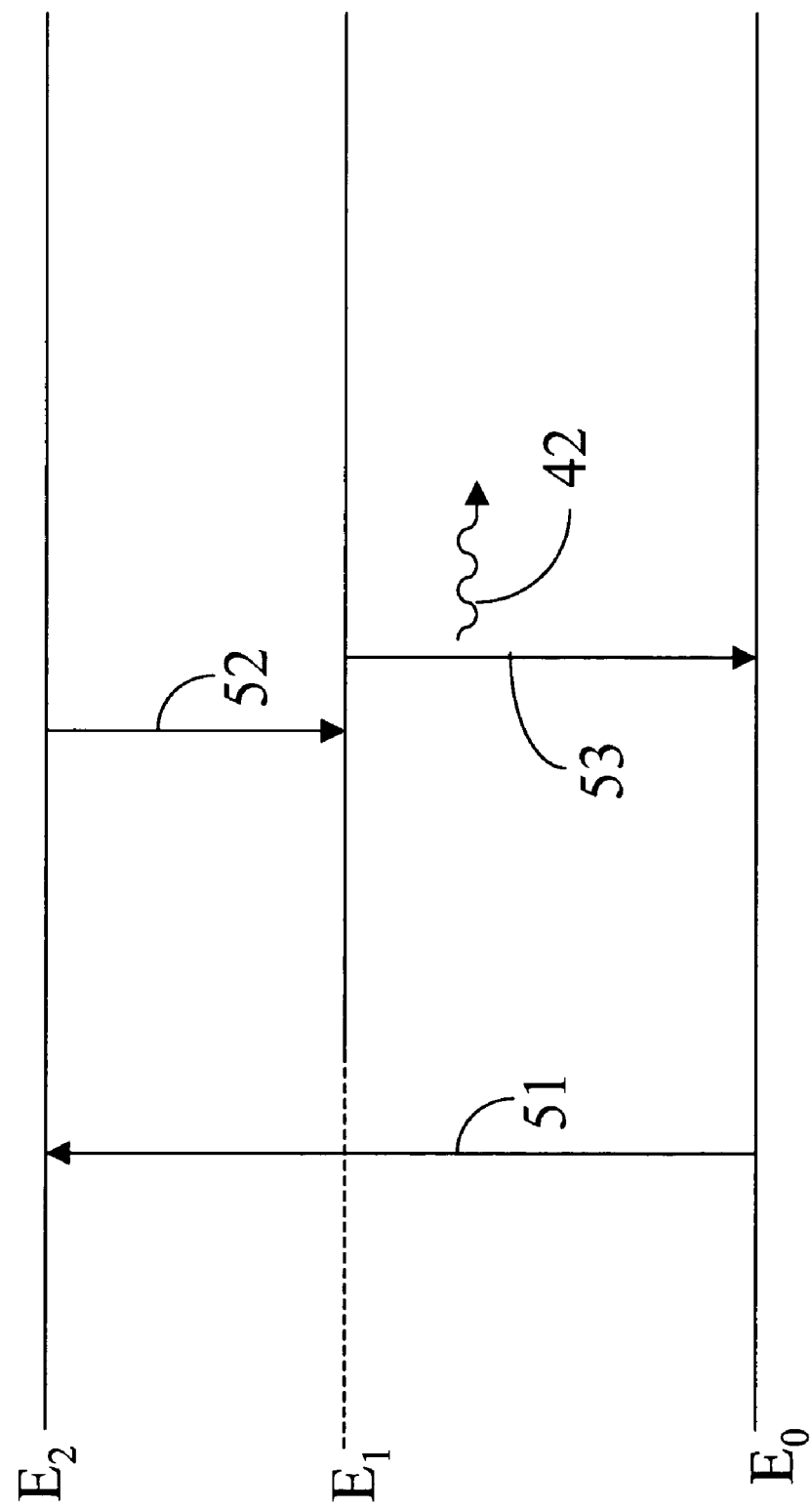
FIG. 3 shows an energy level diagram for a three level system for an exemplary erbium ion $Er^{3+}$.

FIG. 3 shows an energy diagram of the three level system for an exemplary erbium ion $Er^{3+}$. An optical pump power 50 at wavelength of 0.98 µm excites the erbium ion from the ground state $E_0$ to the energy level $E_2$, as illustrated by arrow 51. The ion experiences a rapid decay from energy level $E_2$ to the energy level $E_1$, as illustrated by arrow 52. The erbium ion $Er^{3+}$ drops from the $E_1$ energy level to the ground state $E_0$ as illustrated by arrow 53, emitting a photon 42 having a wavelength of about 1.55 µm. The emitted photon 42 has a probability of being emitted within a range of wavelengths centered about the wavelength region of 1.55 µm.

The higher the doping level of the rare earth ions in the core of the waveguide and the larger the absorption cross section for the optical pump 50, the higher the gain per unit length of the waveguide 15, and the shorter the waveguide 15 needs to be to provide a desired gain.

The optical pump energy 50 may co-propagate or counter-propagate with the optical signal 40. When the optical pump power 50 is at the wavelength that excites the rare earth ions, the photons 42 emitted by a stimulated process as the excited rare earth ions drop into the ground state $E_0$ will amplify the optical signal 40 as the optical signal propagates a short distance through the waveguide 15.

Figure 4:
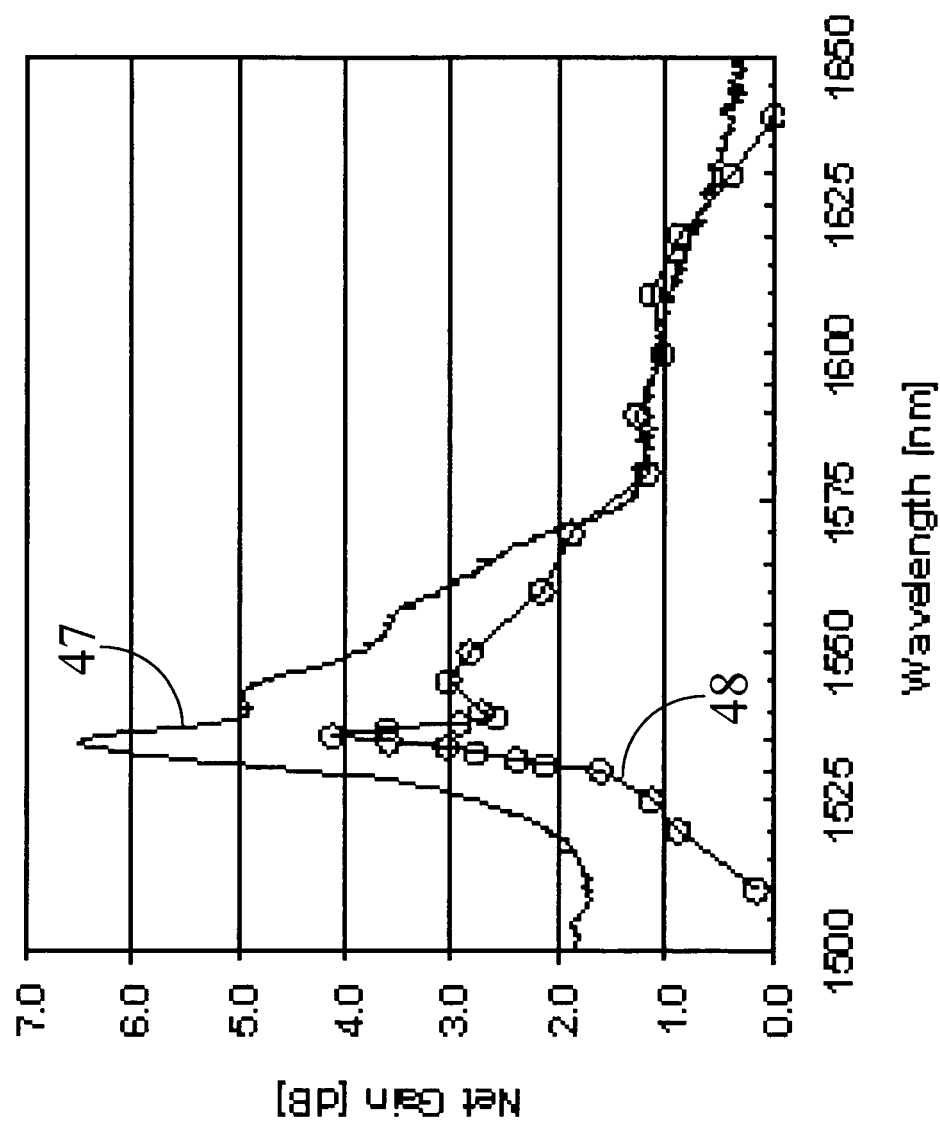
FIG. 4 shows measured and theoretical gain spectra for a compact optical amplifier made in accordance with the present invention.

FIG. 4 shows the theoretical gain spectrum 47 of a compact amplifier 10 in which the material of the waveguide 15 was phosphate glass heavily doped with erbium and ytterbium. Heavily doped, in this embodiment, is a dopant level of about 8 wt % $Er^{3+}$ and about 12 wt % $Yb^{3+}$. Such glass is available from Schott Corporation (number IOG-1). The gain spectrum 48 was measured in a compact optical amplifier 10 in which the waveguide 15 was 3 mm long. The core 20 was formed in the phosphate glass by diffusion of silver atoms and was 13 μm wide and 5 μm thick. Air formed the top portion of the cladding 30. The phosphate glass substrate formed the bottom and side portions of the cladding 30. An optical signal at a wavelength of 1.534 μm was amplified by 4 dB by propagating through the 3 mm length of the compact amplifier 10 with an optical pump power 50 of less than 180 mW at 974 nm coupled into the compact amplifier 10. For comparison, a conventional erbium doped fiber amplifier requires many meters of silica glass fiber to provide this same 4 dB amplification.

In another embodiment, an encapsulating top cladding layer is applied to the surface of the phosphate glass to reduce the scattering loss and to increase the overall transmission of the compact amplifier 10.

Figure 5:
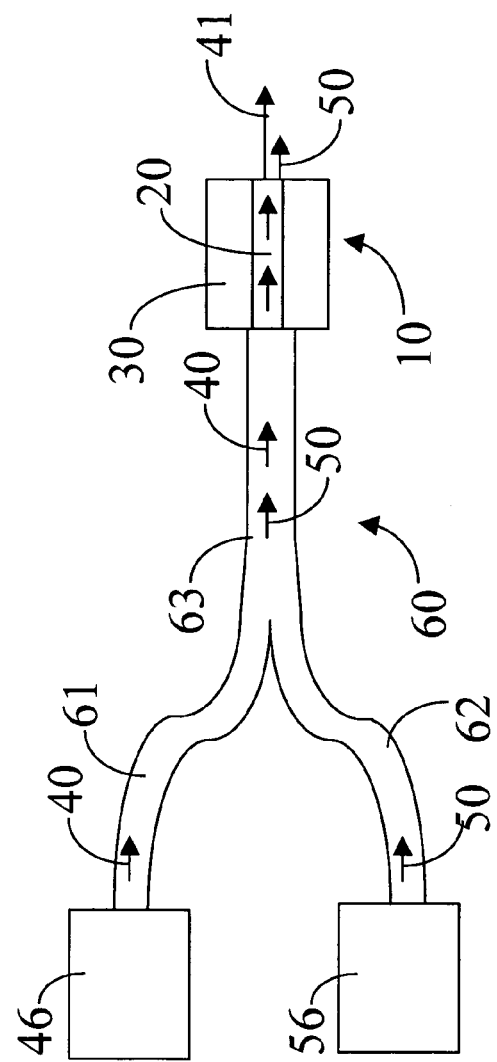
FIG. 5 shows a top view of coupling of optical sources to the compact optical amplifier of FIG. 1.

FIG. 5 shows a top view of an arrangement for coupling of the signal source 46 and the pump source 56 to the compact optical amplifier 10 of FIG. 1. In this embodiment, a y-branch waveguide coupler 60 having waveguide coupling arms 61, 62, 63 is illustrated. The optical pump power 50 emitted from optical pump source 56 is coupled into arm 62 of the y-branch waveguide coupler 60. The optical signal 40 received from a signal source 46 is coupled into arm 61 of the y-branch waveguide coupler 60. Both optical signal 40 and optical pump power 50 propagate through the y-branch waveguide coupler 60 into arm 63. Arm 63 of y-branch waveguide coupler 60 is end fire coupled into core 20 of the amplifier 10 to couple optical signal 40 and optical pump power 50 into the compact amplifier 10.

In one embodiment, the signal source 46 is an optical fiber in a telecommunications system, which carries at least one optical signal. Such an optical fiber may be spliced to coupling arm 61. In alternative embodiments, other methods of coupling the optical pump power 50 and the optical signal 40 into the core 20 of the waveguide 15 are used. Such coupling methods include lens assemblies, diffractive optical elements, directional couplers, grating couplers, fiber couplers, and combinations thereof.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

We claim:

1. An optical amplifier, comprising a waveguide including a core and a cladding, the cladding at least partially surrounding the core, in which the core is doped with $Er^{3+}$ in the range of 7 to 9 wt % and is additionally doped with $Yb^{3+}$ in the range of 11 to 13 wt %.

2. The amplifier of claim 1, in which:
   the waveguide is connected to receive an optical signal to be amplified; and
   the waveguide is connected to receive optical pump power of a wavelength that stimulates the $Er^{3-}$ and the $Yb^{3+}$.

3. The amplifier of claim 2, in which the optical signal to be amplified has a wavelength in the range of 1.5 μm to 1.7 μm.

4. The amplifier of claim 1, in which the waveguide has a length between about 1 millimeter and about 10 millimeters.

5. The amplifier of claim 1, in which the waveguide additionally comprises one of phosphate glass, tellurite glass, and borate glass.

6. The amplifier of claim 1, in which the cladding is doped with $Er^{3+}$ in the range of 7 to 9 wt % and $Yb^{3+}$ in the range of 11 to 13 wt %.

7. The amplifier of claim 6, in which the core is additionally doped with silver atoms.

* * * * *

UNITED STATES PATENT AND TRADEMARK OFFICE
CERTIFICATE OF CORRECTION

PATENT NO. : 7,180,656 B2
APPLICATION NO. : 10/819827
DATED : February 20, 2007
INVENTOR(S) : Falgun Patel It is certified that error appears in the above-identified patent and that said Letters Patent is hereby corrected as shown below:

Col. 6, line 28;
In Claim 2, delete "Er3-" and insert -- Er3+ --, therefor.

Signed and Sealed this

Twenty-ninth Day of July, 2008

JON W. DUDAS
*Director of the United States Patent and Trademark Office*